March 23, 1926.          1,578,146
P. T. LENOIR
BUMPER
Filed June 16, 1925
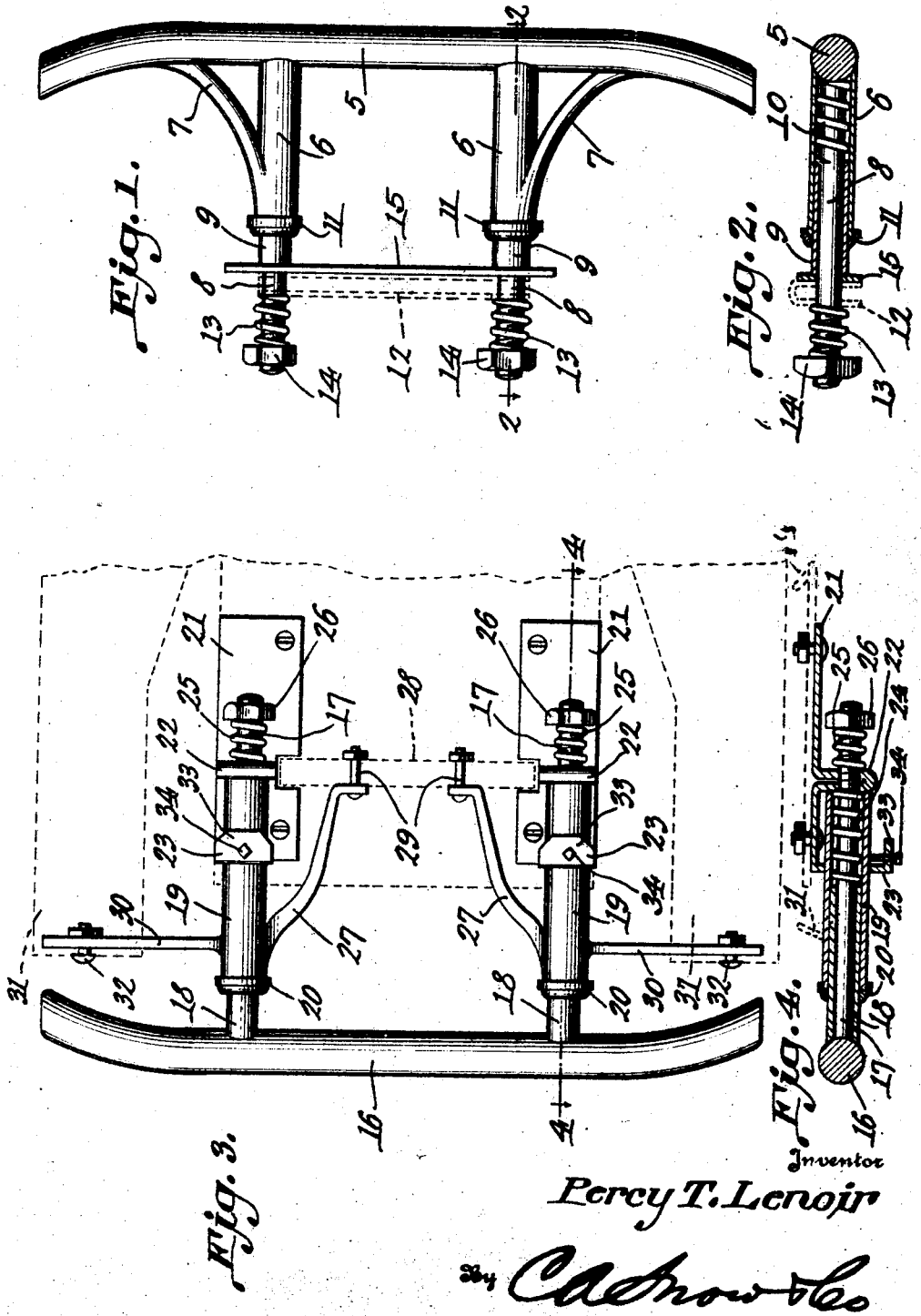
Inventor
Percy T. Lenoir
Attorney Patented Mar. 23, 1926.

1,578,146

UNITED STATES PATENT OFFICE.

PERCY T. LENOIR, OF HATTIESBURG, MISSISSIPPI.

BUMPER.

Application filed June 16, 1925. Serial No. 37,499.

*To all whom it may concern:*

Be it known that I, PERCY T. LENOIR, a citizen of the United States, residing at Hattiesburg, in the county of Forrest and State of Mississippi, have invented a new and useful Bumper, of which the following is a specification.

This invention relates to bumpers especially designed for use in connection with motor vehicles or the like, and aims to provide a novel construction where the strain directed to the bumper will be distributed throughout the various elements forming the bumper to insure against breaking by its contact with an object.

Another important object of the invention is to provide means for cushioning the blow directed to the bumper incident to the bumper contacting with an object.

A still further object of the invention is the provision of means whereby the bumper may be secured and supported by the cross bars of the chassis, eliminating the necessity of securing the bumper to the springs or side rails of the chassis.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a bumper constructed in accordance with the invention and designed for use at the forward end of a motor vehicle.

Figure 2 is a sectional view taken on line 2—2 of Figure 1.

Figure 3 is a plan view of a bumper especially designed for use at the rear end of a motor vehicle.

Figure 4 is a sectional view taken on line 4—4 of Figure 3.

Referring to the drawing in detail, the reference character 5 indicates the main bar of a bumper employed at the forward end of a motor vehicle, the same being constructed of any suitable material and as shown, is slightly curved at points adjacent to its ends.

Secured to the main bar 5 and arranged in parallel spaced relation with each other are the tubular members 6 which are provided with curved bracing arms 7 that are welded, or otherwise secured to the bar 5.

As shown by Figure 2 of the drawing, rods 8 are provided and are secured to the main bar 5, the inner portions of the rods 8 being housed by the tubular members 6. Mounted on the rods 8 are sleeves 9 that are positioned within the tubular members 6, the inner ends of the sleeves 9 acting as stops for the coiled springs 10, the opposite ends of the coiled springs contacting with the bar 5 as clearly shown by Figure 2 so that inward movement of the bar 5 will be restricted by the movement of the coiled springs 10 which will act to return the bar 5 to its normal position after the pressure thereagainst has been relieved.

In order to provide a dust-proof connection between the tubular members 6 and sleeves 9 operating therein, washers 11 are provided at the inner ends of the tubular members. The reference character 12 represents the forward transverse bar employed in connecting the side rails of a motor vehicle chassis, which bar is formed with suitable openings to accommodate the rods 8 of the bumper, the rods 8 being of lengths to extend appreciable distances beyond the inner surface of the bar 12, providing spaces for the coiled springs 13 that have their outer ends bearing against the nuts 14 threaded on the inner ends of the rods 8 so that the tensions of the coiled springs 13 may be regulated.

The sleeves 9 are connected with the bar 15 that is arranged adjacent to the transverse bar 12 of the vehicle chassis so that the sleeves 9 will be held against movement. Thus it will be seen that should the bumper be moved into engagement with an obstacle, the main bar would be forced rearwardly against the tension of the coiled springs 10 which would absorb the shock directed to the vehicle. As the pressure on the bar 5 is relieved, the springs 10 will act to return the bar 5 to its initial position, the coiled springs 13 restricting forward movement of the bar 5 to relieve the springs 10 of undue strain which would be ordinarily directed thereto by the recoil.

Figure 3 which illustrates a bumper especially designed for use as a rear bumper, comprises a main bar 16 to which are secured the rods 17 that extend through tubular members 18, the tubular members 18 being supported within the sleeves 19 that are provided with washers 20 to insure against foreign matter entering between the tubular members and sleeves. Supporting plates indicated at 21 are bolted to the undersides of the chassis of a vehicle to which the bumper is to be secured, and as shown, these supporting plates are provided with offset portions 22 and 23 which are formed with openings, the openings in the offset portions 22 being of diameters to accommodate the rods 17 while the openings in the offset portions 23 are of diameters sufficient to receive the sleeves 19.

Coiled springs 24 are positioned within the sleeves 19 and have their inner ends contacting with the tubular members 18, the opposite ends of the coiled springs engaging the offset portion 22. At the opposite sides of the offset portions 22 are arranged coiled springs 25 that also engage the nuts 26 mounted on the threaded extremities of the rods 17 whereby the tensions of the springs may be regulated at the will of the operator.

Formed integral with the sleeves 19 are arms 27 that have their inner ends extended to a point adjacent to the rear transverse bar 28 of the vehicle frame where they are bolted to the bar 28 by means of the bolts 29. Arms 30 extend laterally from the sleeves 19 and provide means for supporting the rear mud guards or fenders indicated at 31, there being provided bolts 32 that extend through the arms 30 and fenders.

The offset portion 23 of each bracket member has an inwardly extended flange 33 provided with a threaded opening to accommodate the set screw 34 that is adapted to contact with the sleeve 19 associated therewith to secure the sleeve against movement with respect to the bracket member.

From the foregoing detail description, it is believed that the operation and use of the device will be obvious, and that further detail description as to the operation of the device is unnecessary.

I claim:—

1. A bumper including a main bar, rods extending from the bumper and secured thereto, said rods having threaded inner ends, tubular members secured to the main bar and through which the rods operate, sleeves through which the rods operate, supporting members having openings through which the rods move, coiled springs disposed on opposite sides of the supporting members for restricting movement of the main bar and rods connected therewith, and means for adjusting the tensions of the springs.

2. A bumper including a main bar, rods secured to the main bar and extending inwardly therefrom said rods having threaded ends, a supporting bracket having offset portions formed with openings through which the rods extend, coiled springs disposed on opposite sides of one of the offset portions, tubular members mounted on the rods and engaging the coiled springs mounted on the rods, and means for regulating the tensions of the springs.

3. A bumper including a main bar, rods secured to the main bar and extending inwardly therefrom, tubular members mounted on the rods and secured to the main bar, spring members mounted on the rods, brackets including offset portions through which the rods extend, said spring members adapted to engage opposite sides of the offset portion to restrict movement of the rods and main bar, and nuts on the end of the rods for tensioning the springs.

4. A bumper including a main bar, rods extending inwardly from the bar, tubular members secured to the bar and housing portions of the rods, a sleeve mounted on each tubular member a bracket member having an offset portion and having an opening to accommodate the rod associated therewith, coiled springs mounted on the rods and adapted to engage the inner ends of the tubular members, and offset portions of the bracket members, coiled springs mounted on the outer ends of the rods and engaging the opposite sides of the offset portions, and nuts on the rods and engaging the last mentioned springs for tensioning the springs.

5. A bumper including a main bar, rods extending from the main bar and secured thereto, tubular members housing portions of the rods, said tubular members being secured to the main bar, a sleeve mounted on each tubular member, bracket members having offset portions formed with openings through which the rods move, said sleeves being positioned in one of the respective openings of the offset portions, means for securing the sleeves against movement, and coiled springs embracing portions of the rods and engaging offset portions of the bracket members to restrict movement of the main bar.

In testimony that I claim the foregoing as my own, I have hereto affixed my signature.

PERCY T. LENOIR.